J. M. LINE.
COLLAPSIBLE OR FOLDING COT.
APPLICATION FILED JAN. 14, 1919.
1,317,141.
Patented Sept. 23, 1919.
2 SHEETS—SHEET 1.
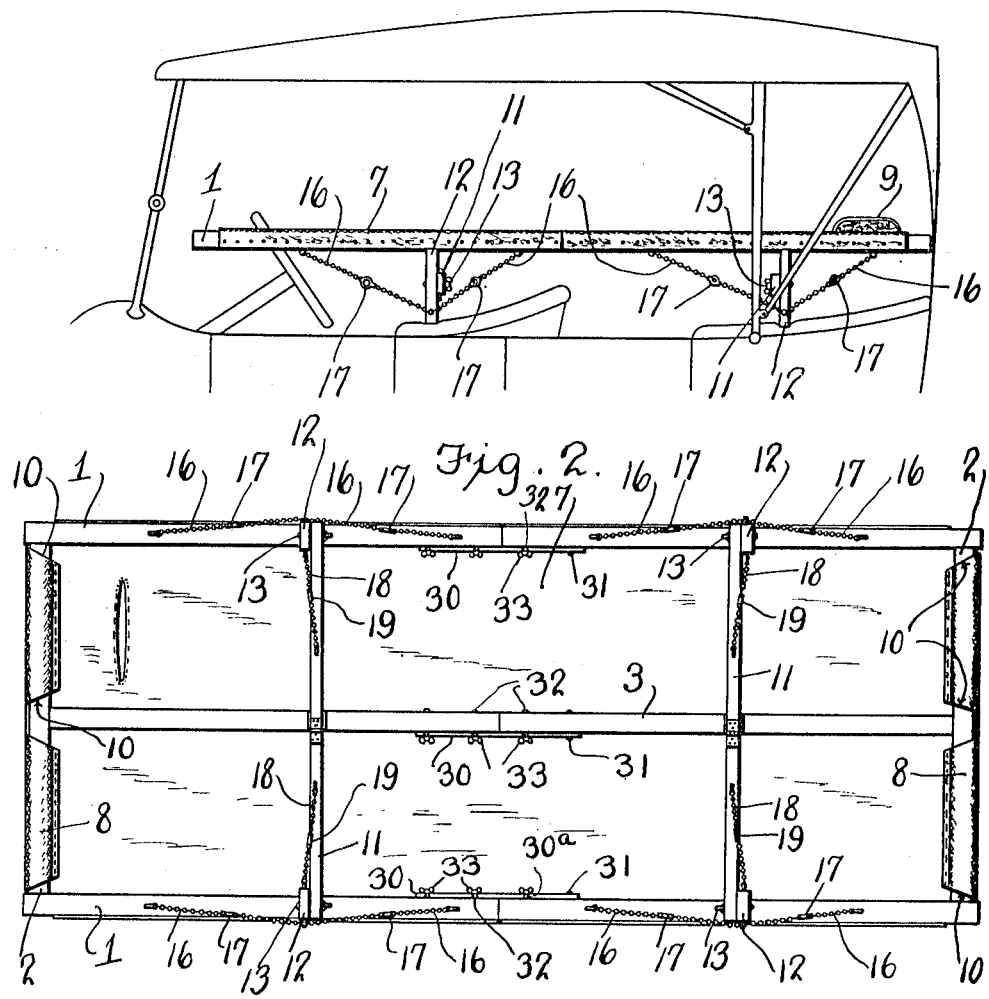
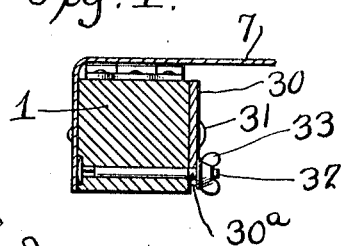
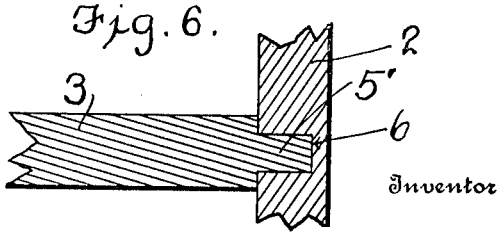
Inventor
John M. Line
By Victor J. Evans
Attorney
Witness
L. B. James
T. E. Turbin J. M. LINE.
COLLAPSIBLE OR FOLDING COT.
APPLICATION FILED JAN. 14, 1919.
1,317,141.
Patented Sept. 23, 1919.
2 SHEETS—SHEET 2.
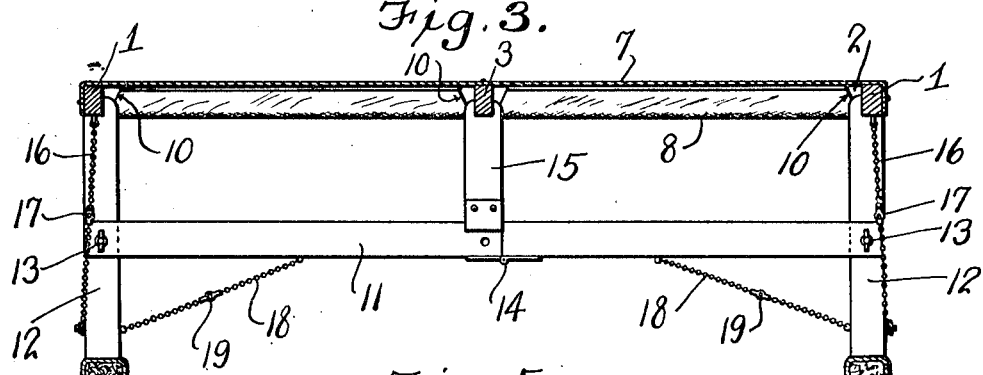
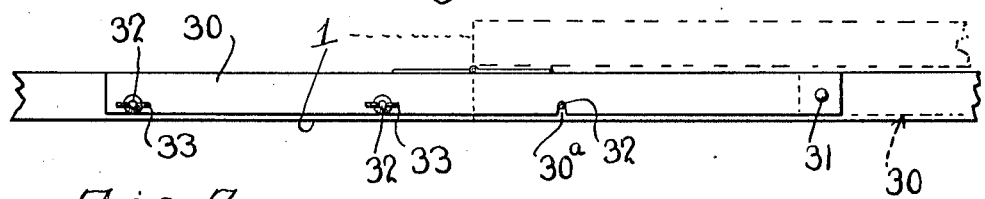
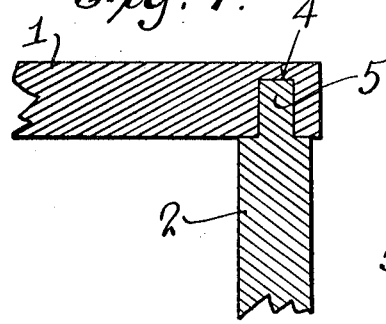
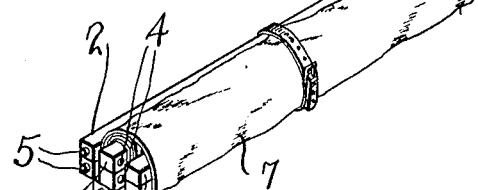
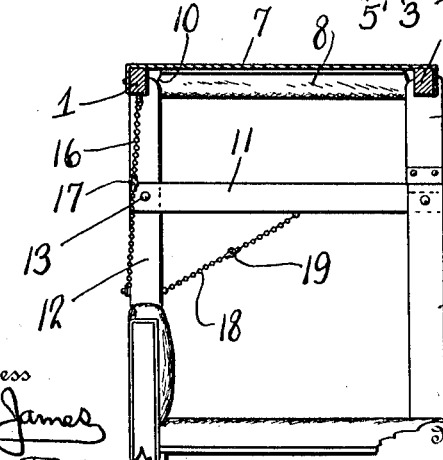
Inventor
John M. Line
By Victor J. Evans
Attorney
Witness
L. B. James

UNITED STATES PATENT OFFICE.

JOHN M. LINE, OF SPRINGFIELD, MISSOURI.

COLLAPSIBLE OR FOLDING COT.

1,317,141. Specification of Letters Patent. Patented Sept. 23, 1919.

Application filed January 14, 1919. Serial No. 271,092.

*To all whom it may concern:*

Be it known that I, JOHN M. LINE, a citizen of the United States, residing at Springfield, in the county of Greene and State of Missouri, have invented new and useful Improvements in Collapsible or Folding Cots, of which the following is a specification.

My present invention relates to collapsible or foldable cots; and it has for one of its objects to provide a collapsible or foldable cot designed more especially for use in an automobile with a view to providing comfortable sleeping accommodation for an autoist when necessity demands, the cot being rigidly braced when open for use and being susceptible of ready manipulation in order to reduce it to a small compass for carrying in the automobile without taking up unnecessary room.

While designed more especially for employment in an automobile as stated, the cot is adapted to be used to advantage in other connections as will fully appear from the following description and claims, when the same are read in connection with the drawings, accompanying and forming part of this specification, in which:

Figure 1 is a view illustrative of the arrangement of my novel cot in an automobile body.

Fig. 2 is an inverted plan view of the cot as the same appears when set up ready for use.

Fig. 3 is a transverse section of the cot in position for use.

Figs. 4 and 5 are enlarged detail views showing the means employed for the rigid bracing of the cot.

Fig. 6 is an enlarged view showing the construction employed in the detachable connection of the center rail to the end bars.

Fig. 7 is an enlarged detail view illustrative of the manner in which the ends of the end bars are detachably connected to the side rails.

Fig. 8 is a view showing the appearance of the cot when the same is collapsed and reduced to a small compass.

Fig. 9 shows a single cot of my invention.

Similar numerals of reference designate corresponding parts in all of the views of the drawings.

The main frame of my novel cot is rectangular in form, and is made up of side rails 1, end bars 2, and a longitudinal central rail 3; the latter however being omitted when the invention is embodied in a single bed or cot, as will hereinafter appear. The side rails 1 are provided in their inner sides and adjacent to their ends with sockets 4, and in said sockets are removably disposed dowels 5 at the ends of the end bars 2. From this it follows that the side rails and the end bars may be readily connected and disconnected; also, that when properly engaged with each other the said side rails and end bars form a rigid and strong frame, and one that it is feasible to make of hard wood which is preferable because of its lightness and strength. The longitudinal central rail 3 is provided at its ends with dowels 5′, and these dowels are designed to be removably arranged in sockets 6 provided in the end bars 2. Manifestly there will be no liability of the rail 3 being casually displaced incidental to the use of the cot, but when desired the end bars may be expeditiously and easily sprung out of engagement with the ends of the rail 3.

Arranged over the main frame is a flexible covering 7 which may be of canvas or other suitable textile material or of any other material compatible with the purpose of my invention. The said covering is permanently fastened to the side rails 1, and is provided at its ends with loops 8 in which the end bars of the main frame are disposed as shown. I also prefer to provide the covering 7 with an exterior loop 9, the same being arranged transversely adjacent to the head end of the frame and being designed to receive grass or other material calculated to serve in connection with the exterior loop in the formation of a comfortable pillow.

It will be readily understood from the foregoing that when the end bars of the main frame are disconnected from the central rail and from the side rails, the end bars may be quickly and easily withdrawn from the end loops of the covering 7, after which the rails, the bars and the cover may be rolled into a small bundle. In order that the end bars and the central rail may be quickly and easily connected and disconnected, I prefer to provide the covering 7 with recesses 10. When deemed expedient, the members of the wooden frame described may be reinforced by metallic portions, but this I have deemed unnecessary to illustrate.

The covering 7 is permanently connected to the longitudinal central rail 3 as well as to the side rails of the main frame and in combination with the said covering 7 and the main frame I provide supports as shown, the said supports being arranged transversely of the cot, and being designed when the cot is employed in an automobile, to maintain the cot in superimposed position upon the ends or side portions of the seats in the automobile. The said transverse supports are made up of cross bars 11, uprights 12 pivotally connected at 13 to the cross bars and extending above and below the same, strap hinges 14 on the undersides of the cross bars in the center thereof, and slotted supports 15 which serve to brace the cross bars, to support the center rail, and to provide rigid and strong joints.

Intermediate of the side rails of the main frame and the lower portions of the uprights comprised in the transverse supports are chains or other suitable cables 16. There are eight of these cables 16, and each is equipped with a turn buckle 17, whereby when necessity demands the cables may be readily rendered taut, and may be as readily loosened, the latter to facilitate disassembling and folding or collapsing of the cot.

Interposed between and connected to the cross bars of the transverse supports and the lower arms of the pivoted uprights are chains or other suitable cables 18, having turn buckles 19. These cables 18 constitute important parts of my invention inasmuch as they are possessed of the capacity of function of drawing the lower arms of the uprights inwardly and thereby moving the upper arms of said uprights outwardly with a view to contributing to the rigidity and strength of the frame and at the same time taking up slack in the flexible covering 7 so as to prevent undue sagging of the latter.

It will be apparent from the foregoing that a cot constructed in accordance with my invention may be readily set up ready for use and may be as expeditiously and easily disassembled and folded or rolled into a bundle of small compass, and this without the employment of tools of any description and without the necessity of invoking the assistance of skilled labor.

It will further be apparent that the use of the cot in a car obviates the necessity of providing a tent or other covering; and further that when reduced to a bundle the cot will take up but a small amount of space in the car. Again it will be readily appreciated that when arranged for use in an automobile, my novel cot does not interfere in any measure with the driving of the automobile. From this it follows that one of the occupants of the car may drive the same while one or more other occupants are resting.

As will be readily understood by reference to Figs. 2 and 5, each side rail 1 and the central rail 3 includes two wooden sections, a metallic strap 30 notched at 30$^a$, Fig. 4, and pivoted at 31 to one section, and bolts 32 and wing-nuts 33 connecting the strap to the sections, the bolts being disposed in said notches. Manifestly when the wing-nuts are loosened, the rail may be folded on the pivot to reduce the length of the rail for carrying purposes.

In the single cot modification of Fig. 9, the rail 3 is made to serve as one side rail, and the inner portion of the cot is supported by comparatively long legs 12$^a$ adapted to bear on the automobile seats.

Having described my invention, what I claim and desire to secure by Letters-Patent, is:—

1. In a collapsible cot, a main frame comprising side rails having sockets in their inner sides adjacent to their ends, end bars having dowels at their ends removably disposed in said sockets, said end bars having sockets in their inner sides, and a longitudinal central rail having dowels at its ends removably disposed in the sockets of the end bars, in combination with a flexible covering permanently attached to the side rails and the longitudinal central rail, and having loops at its ends removably receiving the end bars of the frame, and also having at its ends and in the longitudinal center of the cot recesses for affording access to the joints between the longitudinal central rail and the end bars.

2. In a collapsible cot, a main frame comprising side rails having sockets in their inner sides adjacent to their ends, end bars having dowels at their ends removably disposed in said sockets, said end bars having sockets in their inner sides, and a longitudinal central rail having dowels at its ends removably disposed in the sockets of the end bars, in combination with a flexible covering permanently attached to the side rails and the longitudinal central rail, and having loops at its ends removably receiving the end bars of the frame, and also having at its ends and in the longitudinal center of the cot recesses for affording access to the joints between the longitudinal central rail and the end bars, supports arranged transversely below the main frame at intermediate points in the length thereof and respectively comprising a foldable cross-bar spaced from said frame, a support on said cross-bar and having a bifurcated upper end receiving the central rail of the main frame, uprights pivotally connected to and extending above and below the cross-bar and arranged at their upper ends to rest under and against the inner sides of the side rails of the main frame, transverse cables adjustable as to length and interposed between and connected with the lower arms of the uprights and the cross-bar, and other cables adjustable as to length and interposed between the lower arms of the uprights and the side rails of the main frame.

In testimony whereof I affix my signature.

JOHN M. LINE.